United States Patent

Boday et al.

[11] 4,438,706
[45] Mar. 27, 1984

[54] PROCEDURE AND EQUIPMENT FOR DESTROYING WASTE BY PLASMA TECHNIQUE

[75] Inventors: Ottó Bóday; András Herpay; Ferenc Krajcsovics; István Néveri; Sándor Pete; Ferenc Pócsy; Béla Szikora; Endre Szirmai, all of Budapest, Hungary

[73] Assignee: Villamosipari Kutato Intezet, Budapest, Hungary

[21] Appl. No.: 350,397

[22] Filed: Feb. 19, 1982

[30] Foreign Application Priority Data

Feb. 27, 1982 [HU] Hungary .............................. 485/81

[51] Int. Cl.³ ............................................... F23G 7/04
[52] U.S. Cl. ..................................... 110/238; 110/346; 110/224; 110/215; 110/254
[58] Field of Search ............... 110/238, 254, 251, 224, 110/215, 346

[56] References Cited

U.S. PATENT DOCUMENTS

| 2,102,427 | 12/1937 | Lloyd et al. | 110/224 |
| 2,148,981 | 2/1939 | Dundas et al. | 110/224 |
| 2,171,535 | 9/1939 | Berg et al. | 110/254 |
| 2,655,883 | 10/1953 | Martin | 110/215 |
| 3,794,565 | 2/1974 | Bielski et al. | 110/254 |
| 3,954,381 | 5/1976 | Marecaux | 110/215 |
| 4,007,014 | 2/1977 | Mastsumoto | 432/95 |
| 4,098,006 | 7/1978 | Maffet | 110/224 |
| 4,311,103 | 1/1982 | Hirose | 110/224 |
| 4,326,470 | 4/1982 | Maranhao | 110/224 |
| 4,359,006 | 11/1982 | Have | 110/224 |

Primary Examiner—Henry C. Yuen
Attorney, Agent, or Firm—Murray Schaffer

[57] ABSTRACT

Material is comletely atomized, and converted into a plasma state by directing the feeding of the burner so that the material to be decomposed and an oxidizing agent (oxygen, air, etc.,) are in a suitable ratio at every point of the equipment so that the waste transforms in stable combustion products. There is no need for a catalyst or for any other subsidiary materials. The recovery of certain end products as chemical basic materials is also effected. The oxidizing agent may be air, air enriched with oxygen or oxygen. Plasma can be produced from air, or from the waste, itself. With waste materials containing halogens, it is advisable to introduce water into the plasma to promote the formation of hydrogen halogenids. A MHD generators or conventional heat exchangers may be used and the final gases are to be desacidified before letting them outdoors by treatng them with a weak alkaline washing solution.

6 Claims, 1 Drawing Figure

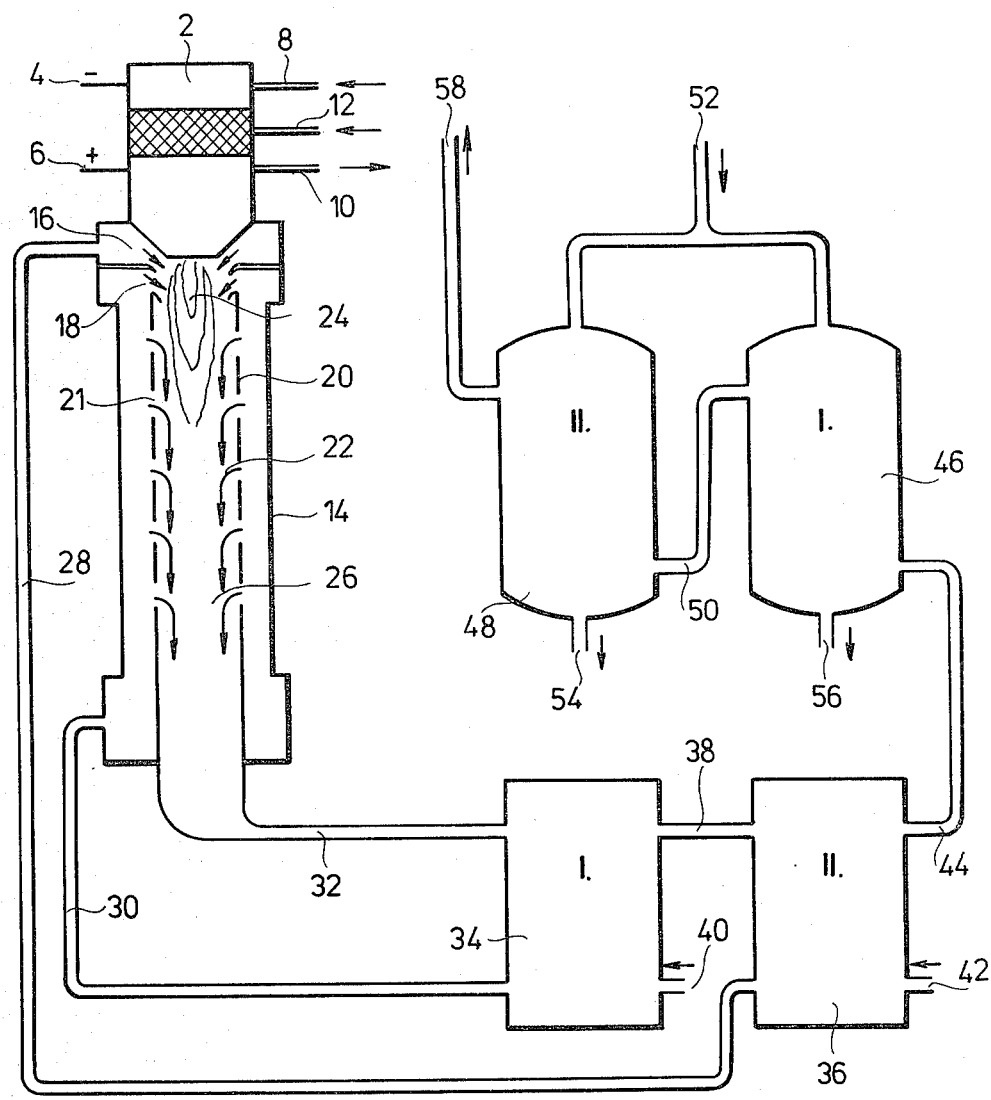

PROCEDURE AND EQUIPMENT FOR DESTROYING WASTE BY PLASMA TECHNIQUE

Subject of the invention: procedure and equipment destroying fluid waste containing organic materials.

It is known that reliable destroying of different industrial and waste from local communities is a problem causing great anxiety all over the world, especially in case of poisonous chemical waste. For solving this problem various technologies have been developed which proved to be successful. Within these, the destroying technologies by burning are expanding also. As a result of the well-directed burning, the poisonous, infectious, etc., waste decomposes to innocuous end products, even it is possible to get also energy back from the combustible materials. Moreover, the volume of the originated ashes, slag, etc., is much less than the original waste.

The realisation of the burning procedure can be grouped mainly in four systems including mining furnaces, ovens for central heating, furnaces with movable beds and those with rotary feeder. The procedures known until now, especially the most developed furnaces with rotary feeder are already capable to solve many problems but there are still many tasks which could be solved only by introducing an entirely new process, namely: hydrocarbons of high chlorination degree and similar halogenous products cannot be burned or only by means of high capacity auxiliary burners, the so-called "supporting burners". Although they are not too sensitive to the composition of the waste, in the interest of the reliable destroying, i.e. in case of violent poisons it is necessary to apply long dwelling period and accordingly, a spacious furnace for obtaining complete burning.

These equipments are operated without exception by hydrocarbon firing, so to run them nowadays is not economical owing to the increasing hydrocarbon prices and to the difficulty of obtaining fuels, in addition, the situation is getting worse in the future.

The aim of the invention is to establish such a technology which makes the destroying of such waste possible not only by a reliable manner but economically, too.

The procedure of the invention is based on the recognition that in the high temperature torch of the high duty industrial plasma flames atomizes practically every known material completely and gets to plasma-state. If we direct the feeding of the plasma flame so that the material to be decomposed and the auxiliary material with an oxidizing effect—usually air, steam, etc.,—be present in a suitable proportion at every point of the equipment, it is then possible that in the recombination zone of the plasma flame only such ratio of molecules be realised, by which the carbon content of the material fed-in leave the reaction zone in form of aqueous vapour, respectively in H-haloids, its other elements emerge from it in state of the maximum oxidation. The working vapour of the plasma generator can be air, air enriched by oxygen or also the steam of the waste to be destroyed.

An other fact that we recognized is that the plasma-torch waste destroyer—owing its principle of operation—can be used for every kind of material. For the burning there is no need for a subsidiary material—e.g. for a catalyst—which makes the operation universal and reduces the costs.

On the basis of the above, the substance of the procedure in the invention is that we produce technical plasma from waste and formit into stable combustion products by introducing extra quantity of oxygen.

We understand technical plasma here to be the state of the material in which at least 0.15% of the material-particles are in ionized state and so they are able to perform various technological duties.

The procedure has the advantage that any kind of industrial organic waste material, especially those having a great halogen content, can be destroyed—independent of the chemical composition of the material—in an equipment planned for a given capacity and the heat content of the outgoing end products in vapour form, as well as the individual components (e.g. chlorine gas) can be utilized in the chemical industry by the known methods.

It is advisable to introduce the extra quantity of oxygen necessary for the procedure in the form of air, as this solution is a more economic technology both as to investition and to operation costs, as that based on pure oxygen.

It is advisable, moreover, to enrich the air with oxygen, if the chemical composition of the waste material requires for the complete destroying a relatively greater oxygen proportion as this makes the applying of a smaller equipment having a less energy demand possible or the increases of the specific power output of the given equipment.

It is advantageous if for the technical plasma we use plasma from the air, as by this way the oxygen ions necessary for the oxidizing reaction in the high temperature space are being directly at disposal for destroying the waste material introduced in the plasma-torch. This solution means at the same time the more economic realisation of te plasma-formation.

It is advantageous moreover, if the technical plasma will be produced directly from the waste, as this is the most rapid, most complete and most effective method for heating waste to be oxidized to plasma state assuring the productivity of the technology.

At destroying waste of halogen content, it is advisable to introduce—besides of oxygen—also water, as during the following gas treatment, the absorbtion of the produced hydrogen haloids is from technological point of view more effective.

We can utilize the energy content of the plasma in an MHD generator. In this case by separation of the cactions and anions there is a possibility for a chemical separation, even eventually for a surplus heat production by means of the subsequently chemical reactions.

We can recover the heat content of the gas originating from the plasma and containing hot combustion products by applying heat exchangers—mainly recuperative or cross flow heat exchangers. In both cases before guiding them outdoors, we can fix the acid content of the escaping gases by a weak acidic washing solution.

For the executing of the procedure, we use such an equipment which—in the sense of the invention—has a plasma generator, a reactor to be connected, as well as feeder armatures introducing fluid waste and oxidizing agent to the plasma generator and/or in the reactor.

We present the invention detailed on the sketch, where we indicated the equipment to be used for the procedure of the invention, as an example.

The outlined equipment serves for destroying chemical waste capable for evaporating—i.e. chlorinated hydrocarbons—in which we apply for establishing plasma-state air plasma produced by 2 plasma generator operated by electric discharge.

The equipment is connected to such further technical equipments which assure by known manner the introduction of th electric energy-supply, cooling water, compressed air and waster material, as well as of the washing liquids into the system and provide of draining the warmed up cooling water, the originated outlet water and final gases and eventual of their transformation.

The construction of the equipment is the following: 2 plasma generator providing air plasma receives D.C. energy supply by 4 and 6 cables. For cooling the plasma generator cooling water ca be introduced by 8 pipe branch. Warmed up cooling water discharges through 10 pipe branch. Compressed air, respectively working gas gets through 12 pipe branch into 2 plasma generator.

2 plasma generator is connected to 14 double-walled plasma reactor of vertical axe so that 24 plasma torch leaving 2 plasma generator gets in its 26 reaction space on the upper part of 14 plasma reactor. 2 plasma generator and 14 plasma reactor are coaxial in case of execution according to the example illustrated. Similarly, on the upper part of 14 plasma reactor is formed the 16 feeder armature serving for introducing organic material into the 24 plasma torch. Under the feeder armature another feeder armature consisting of 18 gas distributing ring can be found. 14 plasma reactor is equipped with an 20 inner cover, the upper part of which is a tube with 21 borings for gas intaking or made of gas permeable ceramics.

The equipment include s also 34 and 36 heat exchangers serving for preheating the organic material and air introduced into 14 plasma reactor. Cool air gets through 40 pipe branch in 34 which is connected by 30 pipe branch with 14 double-walled plasma reactor.

Organic material gets in 36 heat exchanger through 42 pipe branch from where it clears away through 28 tubing and gets into 24 plasma torch through 16 feeder armature of 14 plasma reactor.

Hot gas leaving 14 plasma reactor gets in 34 heat exchanger through 32 tubing, thereafter flows in 36 heat exchanger through 38 connecting piping. Gas drained from 36 heat exchanger through 44 tubing, gets first in 46 gas washing appratus, then in 48 gas washing apparatus through 50 connecting piping and residual gas discharges of the system through 58 tubing. The two gas washing apparatuses should be supplied with washing liquid through 52 pipe branch. Outlet water originating by bindingg the contaminating gas components can be drained through 54 and 56 pipe branches.

The technological process realised by the outlined equipment can be summarized as follows: 2 plasma generator fed by electric power through 4 and 6 cables produces air plasma by heating the compressed air flowing in through 12 pipe branch. Introducing and draining of the cooling water necessary for operating 2 plasma generator is effected by 8 and 10 pipe branches.

Air plasma flows in the inner part of 14 double-walled plasma reactor. 36 heat exchanger heated by hot gases leaving 14 plasma reactor evaporates the fluid organic waste introduced through 42 pipe branch. The vapour gets in 16 feeder armature through 28 tubing which assures the introducing of the organic material into 24 plasma torch, as well as its effective mixing. By this the complete dissociation and partial ionization of the organic material, respectively its formation into plasma takes place.

Oxygen necessary for oxidation of the elements of the organic waste materials is to be introduced in form of preheated air in the inner of 14 plasma reactor through 18 gas distributor where in 26 reaction room the oxidation processes are proceeding.

Preheating of the air coming in 26 reaction room takes place partially in 34 heat exchanger. Air leaving 34 heat exchanger through 30 tubing flows in room between the outer cover made of stainless steel of 14 double-walled plasma reactor and 20 inner cover made of heat-and thermal shock resistant ceramics, upwards, i.e. in opposite direction with the plasma-flowing. Part of the streamingg air, still before reaching the 18 gas distributing ring gets through 21 bores in the inner part of 20 inner cover and along the inner wall of the ceramic pipe it flows forward according to the flowing direction of the plasma, as a cooling gas layer indicated by 22 arrows. This air quantity—although by mixing with the plasma it can contribute to the oxidation, too—performs first thermic and corrosion preventive duties on the most used section of the 14 plasma reactor.

End products being in a hot gas state of the plasma-chemical reaction perform—getting through 32 tubing in 34 heat exchanger—preheating of the air, then flowing through 38 connecting piping in 36 heat exchanger, the evaporization of the organic waste.

For binding the components of the cooled reaction products delecterious to the environment, 46 and 48 gas washing equipment series connected with 50 piping, serve in which we use a basic washing liquid. Introducing of this takes place through 50 pipe branch. Outlet water enriched with polluting compounds is drained through 54 and 56 pipe branches.

Gas mixture cleaned from components deleterious to environment, i.e. containing the contaminating compounds in a concentration allowed by the norms gets in gas washer through 44 tubing and leaves it through 58 tubing. In case of necessity, the final gases can be introduced in chimney after having been transformed according to known methods in the chemistry (e.g. drying, heating).

Examples for destroying organic compounds of various composition by the procedure set forth in the invention:

1. Hydrocarbons:

a. $C_mH_n + \left(m + \dfrac{n}{4}\right).O_2 = mCO_2 + \dfrac{n}{2} H_2O$ b. $C_2H_6 + 3.5.O_2 = 2CO_2 + 3H_2O$ Mass ratio of the starting materials $\dfrac{3,5O_2}{C_2H_6} = 3.7$ c. $C_6H_6 + 7.5.O_2 = 6CO_2 + 3H_2O$ Mass ratio of the starting materials $\dfrac{7,5O_2}{C_6H_6} = 3.07$ It can be seen that in case of increasing the carbon content of the material fed in, the ratio of oxygen necessary for the reaction, descreases. In general, the mass ratio of the starting materials will be about at a value of 3.

2. Compounds containing carbon, hydrogen and oxygen:

a. $C_mH_nO_p + \left(m + \frac{n}{4} - \frac{p}{2}\right).O_2 = mCO_2 + \frac{n}{2}H_2O$ b. $C_6H_{12}O_6 + 6O_2 = 6CO_2 + 6H_2O$ Mass ratio = 1.6 c. $HOCH_2COOH + 1.5O_2 = 2CO_2 + 2H_2O$

Mass ratio = 0.6

At destroying compounds containing oxygen, the quantity of oxygen necessary for complete burning can significantly decrease and the mass ratio can get also under 1.

3. Compounds containing carbon, hydrogen and nitrogen:

a. $C_mH_nN_p + \left(m + \frac{n}{4}\right).O_2 = mCO_2 + \frac{n}{2}H_2O + \frac{p}{2}N_2$ b. $C_mH_nN_p + \left(m + \frac{n}{4} + p\right).O_2 = mCO_2 + \frac{n}{2}H_2O + pNO_2$ c. $C_4H_{12}N_2 + 7O_2 = 4CO_2 + 6H_2O + N_2$ Mass ratio = 2.55 d. $C_4H_{12}N_2 + 9O_2 = 4CO_2 + 6H_2O + 2NO_2$

Mass ratio = 3.27

In case of nitrogen content, the most extreme variation of the possible oxidation processes can be characterized by two kinds of reaction. The maximum ratio of oxygen can surpass 3, but they cannot be higher than 3.5.

4. Compounds containing carbon, hydrogen and sulphur:

a. $C_mH_nS_p + \left(m + \frac{n}{4} + p\right).O_2 = mCO_2 + \frac{n}{2}H_2O + pSO_2$ b. $C_mH_nS_p + \left(m + \frac{n}{4} + 1,5p\right).O_2 =$ $mCO_2 + \frac{n}{2}H_2O + pSO_3$ c. $C_2H_6S + 4,5.O_2 = 2CO_2 + 3H_2O + SO_2$ Mass ratio = 2.32 d. $C_2H_6S + 5.O_2 = 2CO_2 + 3H_2O + SO_3$

Mass ratio = 2.58

In case of compounds containing sulphur there are also more reactions which can be imagined depending of the starting ratio of molecules. Mass ratio of oxygen cannot exceed 3.

5. Compounds containing carbon, hydrogen and halogenid:

a. $C_mH_nX(p + r) + \left(m + \frac{n - p}{4}\right).O_2 =$ $mCO_2 + \left(\frac{n - p}{2}\right).H_2O + pHX + \frac{r}{2}X_2$ where X = an optional halogenid b. $CH_3Cl + 1.5 O_2 = CO_2 + H_2O + HCl$ Mass ratio = 1.19 c. $CH_2Cl_2 + O_2 = CO_2 + 2HCl$

Mass ratio = 0.38 d. $CH Cl_3 + O_2 = CO_2 + HCl + Cl_2$

Mass ratio = 0.27 e. $CCl_4 + O_2 = CO_2 + 2Cl_2$

Mass ratio = 0.21

In case of organic halogenids the mass ratio can also be very low; the oxygen requirement is especially small when mainly halogen molecules are being formed.

6. At destroying of organic halogenids the aim can be that they should be treated together with the other materials to be destroyed. In such a case it is advantageous, if the gas mixture escaping from the plasma-torch space, contains mostly hydrogen halogenids, e.g. hydrochloric acid, as these products can be absorbed effectively in the washing liquid. If the hydrogen content of the waste to be destroyed is low, we promote the formation of hydrogen halogenids by feedin of water, as water disintegrates to its elements at the temperature of the plasma and the hydrogen formed will mainly enter in reaction with the present halogen atoms.

a. $2CHCl_3 + 2H_2 + O_2 = 2CO_2 + 6HCl$ b. $CCl_4 + 2H_2O = CO_2 + 4HCl$

7. On the basis of above examples it can be declared that setting of a 4:1 mass ratio of oxygen: waste material is enough to destroy waste practically of any kind, as it means already in any case a destroying in a surplus quantity of oxygen.

8. If the composition of the waste is known and its destroying requires relatively a great surplus of oxygen, it is then advisable to apply during destroying pure oxygen or air enriched with oxygen, as later a smaller bulk of gas should be treated and the costs of operation decrease.

Regarding the further characterizing of the procedure, we expound the following:

Plasma torch assuring the reaction space can be formed by simulataneous operation of two, respectively more plasma-generators. In these cases the plasma-generators are fitted into the connected reactors so that the whole volume of the plasma-torches produce a greater and continuous reaction space enabling that waste material particles dwell for a longer time in the high temperature zone by which the wanted decomposition process will be completed, at the same time the productivity of the technology also increases. By arranging the plasma-generators circularly, it is possible to form the so-called "plasma-curtain" through which every particle of the material to be decomposed is forced to pass. By arranging the plasma-generators staggered, it is possible to direct and influence the individual phases of the planned chemical reactions.

The plasma reactor can be arranged vertically, horizontally or askew. At feeding in of the waste material we can assure e.g. by pulverization a high degree dispersion and we introduce the disperged particles by means of spraying nozzles into the suitable zone of the plasma torch.

The equipment can be transformed—if built of suitable heat- and corrosion resistant materials—to a completely closed operation type and in this form it corresponds considerably to the regulations of environment protection.

Such a burning equipment requires in comparsion with the traditional equipments a much smaller place and it can be made eventually in a mobile form, too, e.g. similar to a container. Heat inertia of the system is small which is advantageous especially when often started and stopped. For its operation electric current is needed which can be produced and treated easily and economically.

The plasma burner can be utilized not only in independent technologies but owing to its 100 % destroying efficacy and universality as post-burner of the traditional burners, as metioned before, as "supporting burners" too. Operated by such manner it is also of advantage that it does not increase the fuel comsumption of the traditionally burning hydrocarbon.

We claim:

1. Process for destroying fluid waste containing vaporizable organic materials comprising the steps of:
   (a) producing air plasma using D.C. energy supply generator;
   (b) transferring said plasma into a plasma torch at one end of a plasma reactor;
   (c) introducing organic waste vapor and preheated oxygen into said torch for interaction with said plasma; and
   (d) discharging end products of said interaction from the end of said plasma reactor, opposite to the location of said torch, into gas washing equipment.

2. The process of claim 1 wherein the maximum mass ratio of oxygen: waste vapor is 4:1.

3. The process of claim 1 wherein when said waste vapor contains halogen compounds, water vapor is introduced along with said preheated oxygen.

4. The process of claim 1 wherein the heat content of said end products is used in a heat exchanger to vaporize said organic waster and to preheat said oxygen.

5. The process of claim 1 wherein said preheated oxygen is introduced at the end of said reactor opposite to the location of said torch and a portion of said oxygen flows through openings in a ceramic pipe positioned coaxially in said reactor, said oxygen portion acting as a cooling gas layer and as a corrosion preventive.

6. The process of claim 1 wherein vapors treated in said gas washing equipment are released to the atmosphere.

* * * * *